United States Patent
Topchy et al.

(10) Patent No.: US 12,026,315 B2
(45) Date of Patent: *Jul. 2, 2024

(54) METHODS AND APPARATUS TO MONITOR HAPTIC VIBRATIONS OF TOUCHSCREENS

(71) Applicant: The Nielsen Company (US), LLC, New York, NY (US)

(72) Inventors: Alexander Pavlovich Topchy, New Port Richey, FL (US); Jeremey M. Davis, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,233

(22) Filed: Feb. 3, 2023

(65) Prior Publication Data
US 2023/0176656 A1 Jun. 8, 2023

Related U.S. Application Data

(63) Continuation of application No. 17/322,333, filed on May 17, 2021, now Pat. No. 11,573,637, which is a (Continued)

(51) Int. Cl.
*G06F 21/32* (2013.01)
*G06F 3/01* (2006.01)
(Continued)

(52) U.S. Cl.
CPC ............ *G06F 3/016* (2013.01); *G06F 3/0412* (2013.01); *G06F 3/0416* (2013.01); *G06F 3/04883* (2013.01)

(58) Field of Classification Search
CPC ...... G06F 3/016; G06F 3/0412; G06F 3/0416; G06F 3/04883; G06F 3/04186; G06V 40/37
(Continued)

(56) References Cited

U.S. PATENT DOCUMENTS 9,372,979 B2 6/2016 Klein
9,705,676 B2 7/2017 Quirk et al.
(Continued)

FOREIGN PATENT DOCUMENTS

EP 2835917 A1 2/2015
KR 20160098956 A 8/2016
(Continued)

OTHER PUBLICATIONS

Korean Intellectual Property Office, "Notice of Allowance," issued in connection with Korean Patent Application No. 10-2022-7043510, dated Jul. 31, 2023, 3 pages.
(Continued)

*Primary Examiner* — Abdul-Samad A Adediran

(57) ABSTRACT

Methods and apparatus to identify haptic vibrations of touchscreens are disclosed. Example apparatus disclosed herein include means for generating a haptic control signal that is to cause vibrations of a haptic display means, the vibrations to simulate a texture corresponding to visual subject matter to be displayed on the haptic display means, the vibrations of the haptic display means to produce an acoustically detectable signal. Disclosed example apparatus also include means for encoding a watermark into the haptic control signal to generate a watermarked haptic control signal, the watermark including identification information to identify at least one of the subject matter or the texture, the watermark to modify the acoustically detectable signal.

20 Claims, 9 Drawing Sheets

Related U.S. Application Data continuation of application No. 16/044,253, filed on Jul. 24, 2018, now Pat. No. 11,016,568.

(51) Int. Cl.
  *G06F 3/041* (2006.01)
  *G06F 3/04883* (2022.01)

(58) Field of Classification Search
  USPC .......................................................... 726/16
  See application file for complete search history.

(56) References Cited

U.S. PATENT DOCUMENTS

| | | | |
|---|---|---|---|
| 9,760,466 | B2 | 9/2017 | Xu |
| 9,836,929 | B2 | 12/2017 | Rodriguez et al. |
| 11,016,568 | B2 | 5/2021 | Topchy et al. |
| 2008/0031277 | A1 | 2/2008 | Walter et al. |
| 2010/0231550 | A1 | 9/2010 | Cruz-Hernandez et al. |
| 2012/0188176 | A1 | 7/2012 | Uzelac et al. |
| 2012/0327006 | A1 | 12/2012 | Israr et al. |
| 2014/0071117 | A1 | 3/2014 | Schuckle et al. |
| 2014/0306903 | A1 | 10/2014 | Huang et al. |
| 2014/0331313 | A1* | 11/2014 | Kim ..................... G06V 40/37 726/16 |
| 2015/0043891 | A1 | 2/2015 | Diehl |
| 2015/0080060 | A1 | 3/2015 | Rodriguez et al. |
| 2015/0330829 | A1 | 11/2015 | Heske, III |
| 2016/0019901 | A1 | 1/2016 | Topchy et al. |
| 2016/0098956 | A1 | 4/2016 | Park et al. |
| 2016/0232943 | A1 | 8/2016 | Lacroix |
| 2016/0275326 | A1 | 9/2016 | Falkenstern et al. |
| 2016/0299615 | A1* | 10/2016 | Schwarz ............. G06F 3/04186 |
| 2017/0051168 | A1 | 2/2017 | Sacripante |
| 2017/0124818 | A1 | 5/2017 | Ullrich |
| 2017/0168572 | A1 | 6/2017 | Peshkin et al. |
| 2017/0344119 | A1 | 11/2017 | Cherif et al. |
| 2020/0033945 | A1 | 1/2020 | Topchy et al. |

FOREIGN PATENT DOCUMENTS

| | | |
|---|---|---|
| KR | 20170051168 A | 5/2017 |
| WO | 2011147015 A1 | 12/2011 |

OTHER PUBLICATIONS

Belloni et al., "Is haptic watermaking worth it?" Proceedings vol. 6057, Human Vision and Electronic imaging XI; 605712, 2006, 11 pages.

Prattichizzo, Domenico, et al., "Perceptual Issues in Haptic Digital Watermarking," IEEE Computer Society, Jul.- Sep. 2007, 8 pages.

SAKR: "Haptic Data Reduction and Protection in Multimodial Virtual Moments," University of Ottawa, submitted to the Faculty of Graduate and Postdoctoral Studies of Ottawa-Carleton Institute for Electrical and Computer Engineering within the school of information technology and engineering at the University of Ottawa on Dec. 2010, 214 pages.

Gurari, Netta et al., "Perception of force and stiffness in the presence of low-frequency haptic noise," PLOS One, Jun. 2, 2017, availabel at <https://doi.org/10.1371/journal.pone.0178605>, 26 pages.

Tanvas, "Pioneering Surface Haptics," TanvasLabs, retrieved from the Internet on Mar. 12, 2018 <https://tanvas.co/technology/>, 5 pages.

Colgate et al.: "Surface Haptic Technology Development," Neuroscience and Robotics Laboratory, Northwestern University, retrieved from the Internet on Mar. 12, 2018 <https://nxr.northwestern.edu/research/surface-haptic-technology-development>, 3 pages.

United States Patent Office, "Non-Final Rejection", issued in connection with U.S. Appl. No. 16/044,253, dated Nov. 6, 2019, 69 pages.

International Searching Authority, "International Search Report and Written Opinion" issued in connection with application No. PCT/US2019/042174, dated Nov. 6, 2019 (11 pages).

United States Patent Office, "Final Rejection", issued in connection with U.S. Appl. No. 16/044,253, dated Feb. 20, 2020, 186 pages.

United States Patent Office, "Advisory Action", issued in corresponding U.S. Appl. No. 16/044,253, dated Apr. 27, 2020, 3 pages.

United States Patent Office, "Non-Final Rejection", issued in corresponding U.S. Appl. No. 16/044,253, dated Aug. 5, 2020, 200 pages.

United States Patent Office, "Notice of Allowance and Fee(s) Due", issued in corresponding U.S. Appl. No. 16/044,253, dated Jan. 22, 2021, 8 pages.

International Searching Authority, "International Preliminary Report on Patentability," issued in connection with PCT No. PCT/US2019/042174, dated Jan. 26, 2021, 9 pages.

European Patent Office, "Extended European Search Report," issued in connection with European patent application No. 19841173.8, dated Mar. 4, 2022, 11 pages.

Korean Intellectual Property Office,"Request for the Submission of an Opinion," issued in connection with Korean Patent Application No. 20217004848, dated May 30, 2022, 5 pages. (English Translation Included).

United States Patent and Trademark Office, "Non-Final Office Action" issued in connection with U.S. Appl. No. 17/322,333, dated Jul. 5, 2022 (20 pages).

Korean Intellectual Property Office,"Written Decision on Registration," issued in connection with Korean Patent Application No. 20217004848, dated Sep. 11, 2022, 5 pages. (English Translation Included).

United States Patent and Trademark Office, "Notice of Allowance" issued in connection with U.S. Appl. No. 17/322,333, dated Oct. 24, 2022 (8 pages).

United States Patent and Trademark Office, "Notice of Allowance," issued in connection with U.S. Appl. No. 17/322,333, dated Jan. 5, 2023, 6 pages.

Korean Intellectual Property Office,"Request for the Submission of an Opinion," issued in connection with Korean Patent Application No. 20227043510, dated Jan. 19, 2023, 5 pages. (English Translation Included).

\* cited by examiner

METHODS AND APPARATUS TO MONITOR HAPTIC VIBRATIONS OF TOUCHSCREENS

CROSS REFERENCE TO RELATED APPLICATIONS

This patent arises from a continuation of U.S. patent application Ser. No. 17/322,333, which was filed on May 17, 2021, now U.S. Pat. No. 11,573,637, and which is a continuation of U.S. patent application Ser. No. 16/044,253, which was filed on Jul. 24, 2018, now U.S. Pat. No. 11,016,568, U.S. patent application Ser. No. 16/044,253 and U.S. patent application Ser. No. 17/322,333 are hereby incorporated herein by reference in their entireties. Priority to U.S. patent application Ser. No. 16/044,253 and U.S. patent application Ser. No. 17/322,333 is claimed.

FIELD OF THE DISCLOSURE

This disclosure relates generally to haptic technology, and, more particularly, to methods and apparatus to monitor haptic vibrations of touchscreens.

BACKGROUND

Haptic technology can enhance user-interactions with computing devices by providing tactile-based feedback to users. An example tactile-based feedback that may be physically sensed by a user is a vibration.

DETAILED DESCRIPTION

Figure 1:
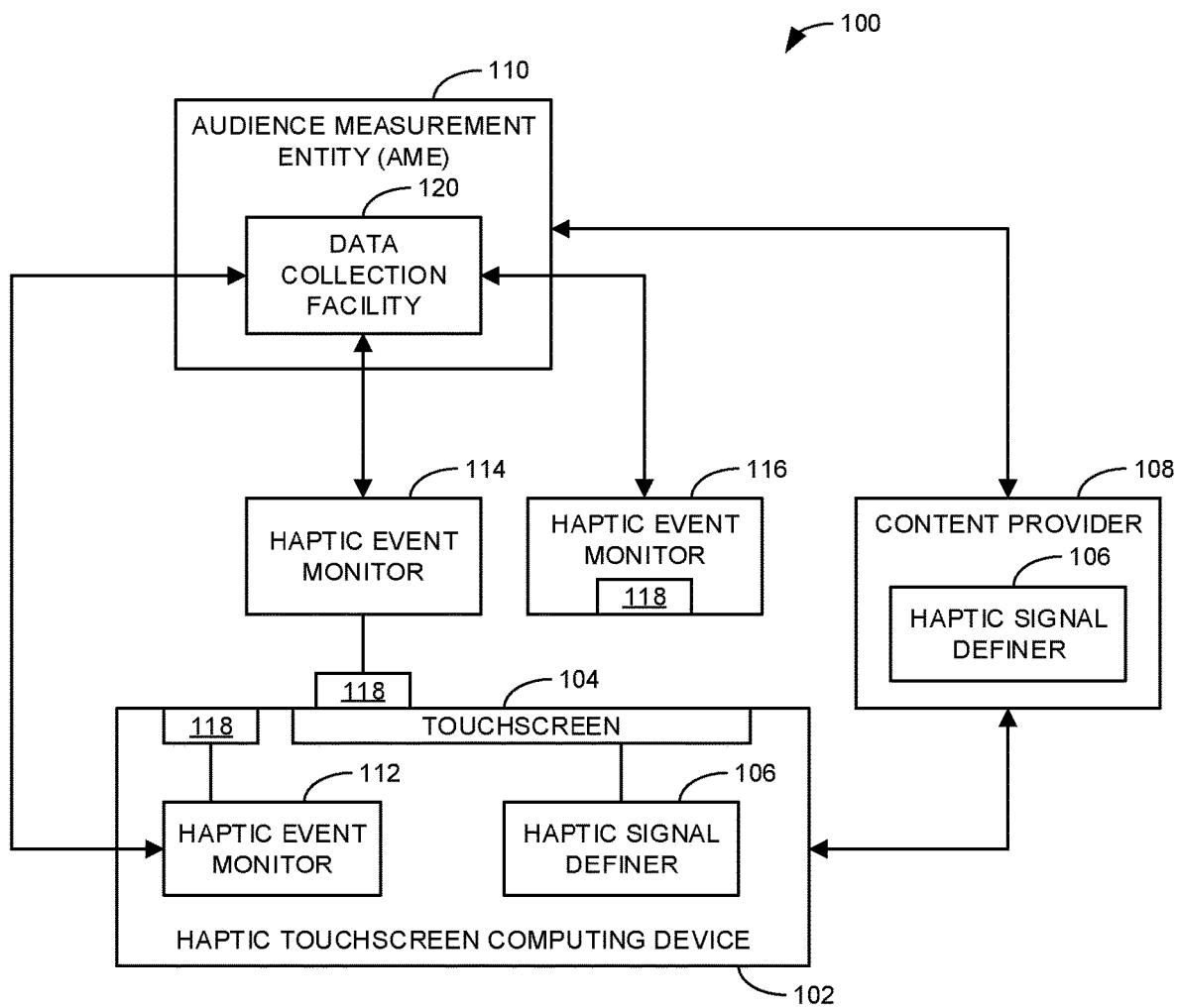
FIG. 1 is a block diagram of an example environment in which teachings disclosed herein may be implemented.

In recent years, researchers have developed touchscreens that are capable of vibrating based on programmable surface haptic control signals to generate a perception or sensation of a texture to a user interacting with (e.g., touching) the touchscreen. For example, although a touchscreen is flat, the touchscreen may undergo ultrasonic vibrations in such a manner as to give a user sliding their finger across the screen the sense that they are touching a rough surface, a bumpy surface, a ridged surface, or any other type of surface associated with a particular tactile sensation. In some examples, the particular texture generated by the surface haptic control signal is associated with the visual content being displayed on the touchscreen. Thus, a user may experience the sensation of touching whatever is being displayed on the screen. There are many applications for such technology including, for example, enabling people to experience the touch and feel of a product (e.g., a particular fabric for clothing) before purchasing it, providing new forms of experiences in video games, enabling people to share a "physical" (e.g., touch-based) interaction despite being remotely located from one another, assisting the blind or visually impaired (e.g., similar to how such people can read by touching braille), enabling users to perceive (through the sense of touch) an edge of a virtual button displayed on the touchscreen, etc.

Although the vibrations of a touchscreen, as described above, are designed to produce a specific tactile sensation for a user, the vibrations also produce an acoustic signal. The acoustic signal may or may not be perceptible to a human (e.g., the user of the touchscreen) but may be detected by sensors (e.g., a microphone). Examples disclosed herein use such sensors to monitor and detect the haptic vibrations of a touchscreen to identify the particular texture being conveyed by the vibrations. In this manner, the activity and/or behavior of the user (e.g., the content the user is accessing on a computing device with the vibrating touchscreen) can be determined. The distance that the sensor needs to be from the touchscreen to adequately detect any acoustic leakage caused by the haptic vibrations may depend on the nature of the vibrations and the quality or sensitivity of the sensor. In some examples, the sensor may be physical affixed to the touchscreen. In other examples, the sensor may be spaced apart from the touchscreen. In some examples, the sensor may be a microphone incorporated into the same device that includes the touchscreen. In other examples, the sensor may be associated with a separate device.

Examples disclosed herein may monitor (e.g., detect and identify) haptic vibrations either actively, based on audio watermarks, or passively, based on audio signatures. Audio watermarking is a technique used to identify media such as television broadcasts, radio broadcasts, advertisements (television and/or radio), downloaded media, streaming media, prepackaged media, etc. Audio watermarks are also frequently used for forensic purposes and rights management, such as to detect if watermarked media has been altered or can be accessed by a specific party. Existing audio watermarking techniques identify media by embedding one or more audio codes (e.g., one or more watermarks), such as content identifying information and/or an identifier that may be mapped to identifying information, into an audio and/or video component. In some examples, the audio or video component is selected to have a signal characteristic sufficient to hide the watermark perceptually, or hide its presence from a range of objective analysis methods, or otherwise. In examples disclosed herein, a watermark is encoded into the surface haptic control signal so as to be detectable in the acoustic signal generated by the corresponding haptic vibration of a touchscreen. As used herein, the terms "code" or "watermark" are used interchangeably and are defined to mean any identification information (e.g., an identifier) that may be inserted or embedded in an acoustic signal associated with a haptic vibration of a touchscreen (e.g., indicative of a texture) for the purpose of identifying the texture and/or the content and/or source of the content displayed on the touchscreen in connection with the vibration. To identify watermarked content, the watermark(s) are extracted and used to access a table of reference watermarks that are mapped to identifying information, or parsed by a set of rules to yield the information sufficient to identify content.

Unlike monitoring techniques based on codes and/or watermarks included with and/or embedded in the vibrations of a surface haptic touchscreen, fingerprint or signature-based monitoring techniques generally use one or more inherent characteristics of the monitored signal (e.g., an acoustic signal) during a monitoring time interval to generate a substantially unique proxy for the signal. Such a proxy is referred to as a signature or fingerprint, and can take any form (e.g., a series of digital values, a waveform, etc.) representative of any aspect(s) of the acoustic signal. Signatures or fingerprints are normally significantly smaller in size than their original media content size, and require less computing effort, but are sufficiently unique to enable most of the content recognition, identification, and retrieval purposes. A signature may be a series of signatures collected in series over a timer interval. In the context of haptic vibration monitoring, a good signature is repeatable when generated from instances of the same vibration, but is unique relative to other (e.g., different) vibrations corresponding to different haptic content (e.g., associated with different textures). Accordingly, the term "fingerprint" and "signature" are used interchangeably herein and are defined herein to mean a proxy for identifying a texture and/or content associated with the texture that is generated from one or more inherent characteristics of an acoustic signal generated from a haptic vibration producing the sensation of the texture.

Signature-based media identification or recognition generally involves determining (e.g., generating and/or collecting) signature(s) representative of a signal (e.g., an acoustic signal) output by a monitored computing device (e.g., via vibrations of a touchscreen) and comparing the monitored signature(s) (sometimes referred to as query signature(s)) to one or more references signatures corresponding to known (e.g., reference) content and/or associated textures generated from haptic vibrations. Various comparison criteria, such as a cross-correlation value, a Hamming distance, etc., can be evaluated to determine whether a monitored signature matches a particular reference signature. When a match between the monitored signature and one of the reference signatures is found, content and/or texture identifying information for the reference signature may be associated with the monitored/query signature.

FIG. 1 is a block diagram of an example environment 100 in which teachings disclosed herein may be implemented. In the illustrated example of FIG. 1, an example haptic touchscreen computing device 102 includes an example touchscreen 104 equipped with actuators and/or other components that enable the touchscreen 104 to produce a surface haptic vibration. The use of the term "surface" in the context of "surface haptic vibration" is to distinguish conventional haptic vibrations commonly used in many handheld devices (e.g., that vibrate the entire device using an off-balanced motor) from precise ultrasonic vibrations of a touchscreen (e.g., the "surface" of a device) that provide a specific and identifiable tactile experience to a person touching the touchscreen. Thus, as used herein, the term "surface haptic vibration" refers to vibrations of a touchscreen (or other user interface) that produce the perception of a particular texture recognizable by a person touching the touchscreen (or other user interface). The example touchscreen 104 may be vibrated in different ways to generate different textures.

In the illustrated example, the vibrations of the touchscreen 104 are controlled by a surface haptic control signal generated or defined by an example haptic signal definer 106. In some examples, the surface haptic control signal is generated to correspond to visual content displayed via the touchscreen 104. That is, in some examples, the texture(s) produced by the surface haptic vibrations of the touchscreen 104 are intended to replicate the physical touch or feel of whatever is being displayed on screen (e.g., the feel of a piece of fabric displayed on screen, the edges of buttons on a keypad displayed on screen, bumps corresponding to characters of text displayed on screen, etc.). Accordingly, in some examples, the media content accessed by the computer device 102 includes parameters or definitions associated with the visual content to enable the haptic signal definer 106 to generate the appropriate haptic vibration control signal(s). In some examples, a content provider 108 provides such parameters and/or definitions along with the visual content to the computing device 102. Additionally or alternatively, the content provider 108 may include some or all of the functionality of the haptic signal definer 106. In some such examples, the content provider 108 may provide, via the haptic signal definer 106, an executable file or program fully defining the haptic vibration control signal for the touchscreen 104 of the computing device 102. In other examples, the haptic signal definer 106 of the content provider 108 generates some parameters or general/initial instructions for the haptic vibration control signal that are further developed by the haptic signal definer 106 of the computing device 102. Further detail regarding the haptic signal definer 106 is provided below in connection with FIG. 3.

As the use of haptic touchscreens 104 becomes more prevalent, a consumer research or an audience measurement entity (AME) 110 may desire to track the usage of such technology and/or monitor what content and/or associated texture(s) a person is exposed to while interacting with the computing device 102. Accordingly, in some examples, the AME 110 may provide a user of the computing device 102 with one or more example haptic event monitors 112, 114, 116 to monitor the vibrations of the touchscreen 104 to detect the content and/or associated texture(s) associated with the content. In the illustrated example, the first haptic event monitor 112 is integrated with and/or implemented by the computing device 102. The other two haptic event monitors 114, 116 are external to the computing device 102 (e.g., are implemented on a separate device). In some examples, only one or a subset of the haptic event monitors 112, 114, 116 is/are implemented. However, three different haptic event monitors 112, 114, 116 are shown in FIG. 1 to illustrate different implementations.

The haptic event monitors 112, 114, 116 monitor the surface haptic vibrations of the touchscreen 104 by detecting an acoustic signal produced by the vibrations. Accordingly, as shown in the illustrated example, each of the haptic event monitors 112, 114, 116 are associated with a corresponding acoustic or audio sensor 118 such as, for example, a microphone. In some examples, the sensor 118 corresponds to a microphone of the haptic touchscreen computing device 102 (such as the sensor 118 associated with the integrated haptic event monitor 112). In some examples, the sensor 118 is a button microphone physically affixed to the touchscreen 104 to facilitate the detection of the vibrations (such as the sensor 118 associated with the second haptic event monitor 114). In some examples, the sensor 118 may be separate and spaced apart from the touchscreen 104 and associated computing device 102 (such as the sensor 118 associated with the second haptic event monitor 114). The distance between the sensor 118 and the touchscreen 104 depends on the sensitivity of the sensor 118 and the nature of the vibrations of the touchscreen 104. As mentioned above, the vibrations of the touchscreen 104 are ultrasonic vibrations. Accordingly, in some examples, the sensor 118 is an ultrasonic sensor.

In some examples, any one of the haptic event monitors 112, 114, 116 may passively monitor an acoustic signal generated from the vibrations of the touchscreen 104 by sampling the acoustic signal to generate an audio signature or fingerprint of the acoustic signal. The audio signature may be transmitted to a centralized data collection facility 120 of the AME 110 for subsequent analysis and processing. In particular, in some examples, the data collection facility 120 compares collected audio signatures (referred to as query signatures) with a database or library of reference signatures with known characteristics (e.g., associated with known content and/or known texture(s)). In some examples, the reference signatures are generated based on the content provider 108 providing the same content used to generate the surface haptic vibrations on the touchscreen 104 to the AME 110.

Additionally or alternatively, the haptic event monitors 112, 114, 116 may actively monitor an acoustic signal generated from the vibrations of the touchscreen 104 by monitoring for watermarks embedded in the acoustic signal. In some examples, the watermarks include identifying information that identifies the content displayed on the touchscreen 104 and/or the associated texture(s) generated by the surface haptic vibrations of the touchscreen 104. In some examples, the identifying information may directly identify the content and/or associated texture(s). In other examples, the identifying information may include an identifier that may be used to look up the content and/or associated texture(s) in a corresponding database. In such examples, the identifying information may be shared between the content provider 108 and the AME 110 so that watermarks encoded in content produced by the content provider 108 will have information matching the information stored in a database maintained by the data collection facility 120.

In some example, the haptic signal definer 106 encodes the watermarks into the haptic control signal before the signal is provided to control vibrations of the touchscreen 104. In some examples, watermark encoding is performed by the haptic signal definer 106 implemented by the computing device 102 after the computing device accesses or receives the content from the content provider 108. In other examples, the encoding of watermarks may be performed by the haptic signal definer 106 implemented by the content provider 108 (or a different third party) before the content is provided to the computing device 102. Once the haptic event monitor 116 extracts a watermark from an acoustic signal generated by the touchscreen 104, the haptic event monitor 116 may transmit the watermark to the data collection facility 120 for subsequent analysis and processing.

Figure 2:
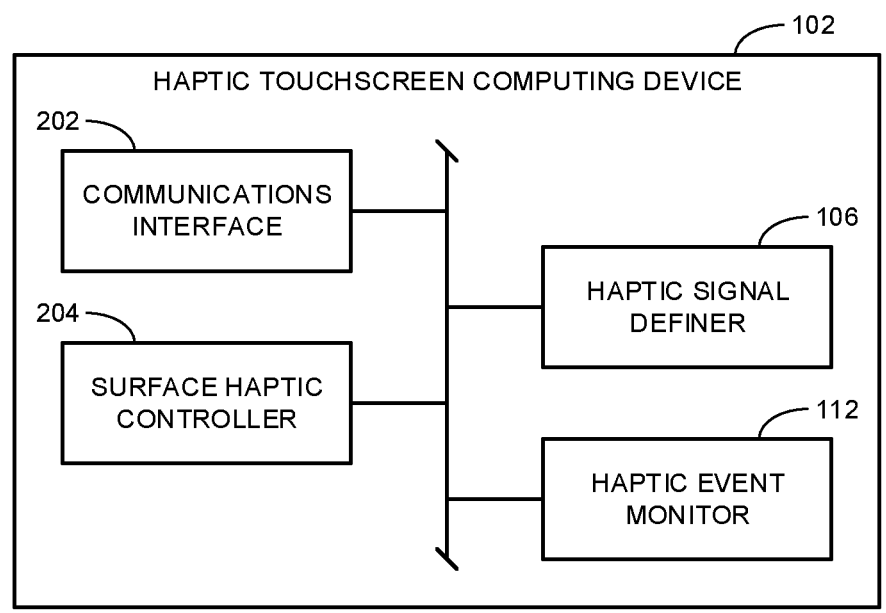
FIG. 2 is a block diagram illustrating an example implementation of the haptic touchscreen computing device of FIG. 1.

FIG. 2 is a block diagram illustrating an example implementation of the haptic touchscreen computing device 102 of FIG. 1. As shown in the illustrated example, the computing device 102 includes an example communications interface 202, an example surface haptic controller 204, the example haptic signal definer 106, and the example haptic event monitor 112. Although briefly mentioned in FIG. 2, further detail regarding the implementation of the haptic signal definer 106 and the haptic event monitor 112 is provided below in connection with FIGS. 3 and 4.

The example communications interface 202 of FIG. 2, which may be implemented by a modem or other communication device, enables the example computing device 102 to communicate with the AME 110 to, for example, receive instructions to implement the haptic event monitor 112 and/or information to enable the haptic signal definer 106 to modify surface haptic control signals to include watermarks. Further, the example communications interface 202 enables the transmission of haptic metering data (e.g., audio signatures and/or audio watermarks) generated by the haptic event monitor 112 to the data collection facility 120 of the AME 110 via a network (e.g., the Internet).

In the illustrated example, the communications interface 202 enables the computing device 102 to request media (e.g., content and/or advertising) from a content provider 108 via a network (e.g., the Internet). In such examples, as the content provider 108 delivers the requested media content, the content provider 108 may also provide a surface haptic control signal associated with the content. The example surface haptic controller 204 uses the surface haptic control signal to control the vibrations of the touchscreen 104 of the computing device 102 in a manner that generates the perception of a texture associated with the visual content displayed on the touchscreen 104. In some examples, the surface haptic control signal provided by the content provider 108 includes one or more embedded watermarks that may be detected from an acoustic signal emitted as the resulting vibrations of the touchscreen 104. In other examples, the haptic signal definer 106 modifies the surface haptic control signal received from the content provider 108 to encode or embed the watermark(s) therein. In other examples, the content provider 108 may provide definitions, parameters, and/or other instructions that describe the visual content of the media accessed by the computing device 102. In such examples, the haptic signal definer 106 uses such definitions, parameters, and/or instructions to identify the content and/or corresponding texture(s) to generate the surface haptic control signal that is then provided to the surface haptic controller 204 to control the touchscreen 104.

While an example manner of implementing the haptic touchscreen computing device 102 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example surface haptic controller 204, the example haptic signal definer 106, the example haptic event monitor 112, and/or, more generally, the example computing device 102 of FIG. 2 may be implemented by hardware, software, firmware and/or any combination of hardware, software and/or firmware. Thus, for example, any of the example communications interface 202, the example surface haptic controller 204, the example haptic signal definer 106, the example haptic event monitor 112, and/or, more generally, the example computing device 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example surface haptic controller 204, the example haptic signal definer 106, and/or the example haptic event monitor 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing device 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
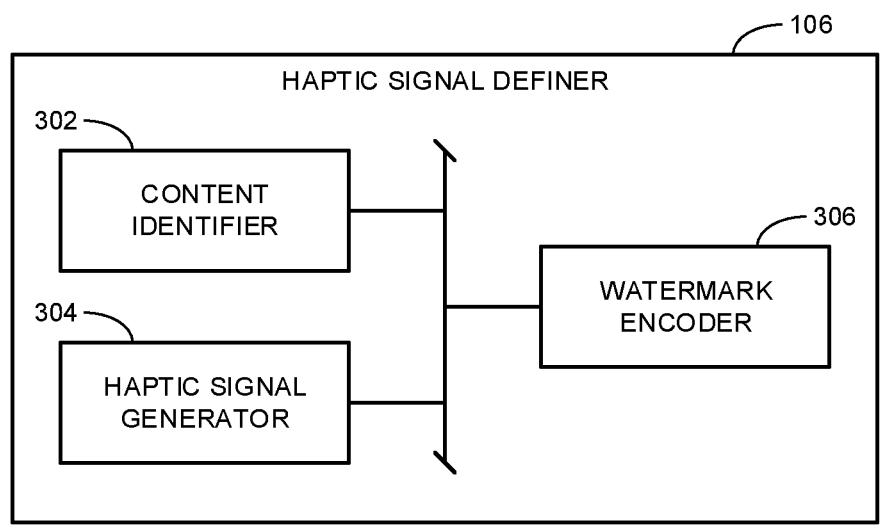
FIG. 3 is a block diagram illustrating an example implementation of the example haptic signal definer of FIGS. 1 and/or 2.

FIG. 3 is a block diagram illustrating an example implementation of the example haptic signal definer 106 of FIG. 1. As shown and described in FIG. 1, the haptic signal definer 106 may be implemented by the computing device 102 and/or the content provider 108. In some examples, some functionality of the haptic signal definer 106 is implemented by the computing device 102 while different functionality of the haptic signal definer 106 is implemented by the content provider 108. In the illustrated example, the haptic signal definer 106 includes an example content identifier 302, an example haptic signal generator 304, and an example watermark encoder 306.

The example content identifier 302 identifies visual content of media to be displayed via a touchscreen to determine the texture(s) to be generated by the touchscreen 104 when the visual content is displayed and a user touches the screen. In some examples, the content identifier 302 identifies the content based on an image analysis of the visual content. For example, the content identifier 302 may identify lines and/or edges in the visual content to define the location of specific features of the content. In some examples, the content identifier 302 may identify text within the visual content. In some examples, the content identifier 302 may parse metadata provided with the visual content that includes parameters, definitions, and/or instructions identifying the content and/or defining the nature of texture(s) associated with the visual content.

The content and/or the relevant texture(s) identified by the content identifier 302 are provided to the haptic signal generator 304 to generate a particular surface haptic control signal that enables the surface haptic controller 204 of FIG. 2 to control the vibrations of the touchscreen 104 of FIG. 1.

In the illustrated example, the haptic signal definer 106 includes the watermark encoder 306 to modify or alter the surface haptic control signal generated by the haptic signal generator 304 to include one or more watermarks. In some examples, watermarks are encoded into a surface haptic control signal by modifying the control signal to generate vibrations of defined durations at different frequencies to represent different watermark symbols. Additionally or alternatively, the surface haptic control signal may be modified to generate vibrations with different amplitudes and/or phases to represent different watermark symbols. In some examples, the vibration frequencies, phases, and/or amplitudes chosen to induce detectable audio signals may not be discernible to human touch. That is, in some examples, the differences in vibrations caused by a surface haptic control signal before and after a watermark is encoded therein is not discernable to a human touching the vibrating touchscreen. Additionally or alternatively, watermark symbols may be carried by vibrations that are not of tonal or harmonic nature, but by a modulated signal with an amplitude that is an arbitrary function of time.

As described above, the watermark(s) may include identifying information that identifies the content and/or associated texture(s) for the content displayed via the touchscreen 104. In some examples, the identifying information is determined by the content identifier 302. In some examples, the identifying information may include an identifier indicative of the source of the content that can be used to look up the particular content and/or associated texture(s). In some examples, the identifying information is provided by the AME 110.

While an example manner of implementing the haptic signal definer 106 of FIGS. 1 and 2 is illustrated in FIG. 3, one or more of the elements, processes and/or devices illustrated in FIG. 3 may be combined, divided, re-arranged, omitted, eliminated and/or implemented in any other way. Further, the example content identifier 302, the example haptic signal generator 304, the example watermark encoder 306, and/or, more generally, the example haptic signal definer 106 of FIG. 3 may be implemented by hardware, software, firmware and/or any combination of hardware, software and/or firmware. Thus, for example, any of the example content identifier 302, the example haptic signal generator 304, the example watermark encoder 306, and/or, more generally, the example haptic signal definer 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example content identifier 302, the example haptic signal generator 304, and/or the example watermark encoder 306 is/are hereby expressly defined to include a non-transitory computer readable storage device or storage disk such as a memory, a digital versatile disk (DVD), a compact disk (CD), a Blu-ray disk, etc. including the software and/or firmware. Further still, the example haptic signal definer 106 of FIGS. 1 and/or 2 may include one or more elements, processes and/or devices in addition to, or instead of, those illustrated in FIG. 3, and/or may include more than one of any or all of the illustrated elements, processes and devices.

Figure 4:
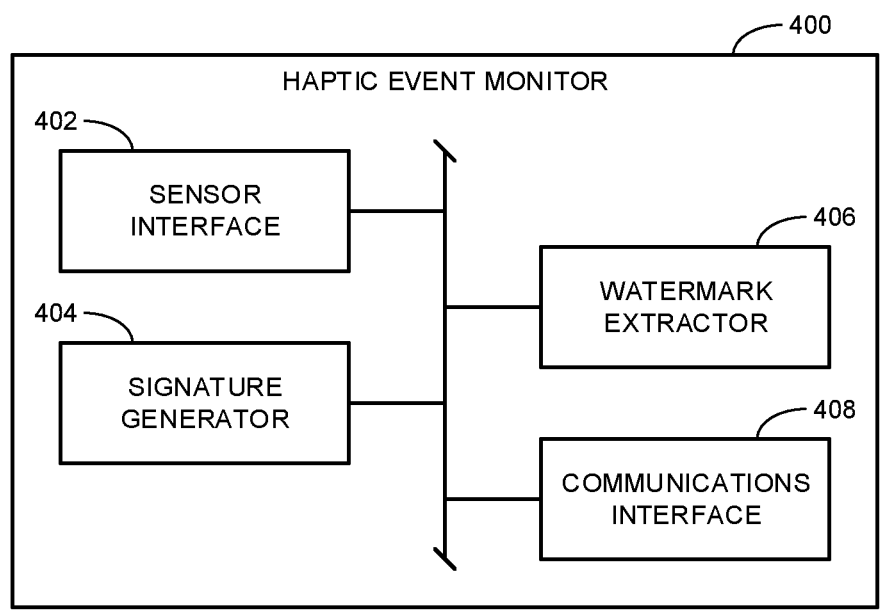
FIG. 4 is a block diagram illustrating an example implementation of the example haptic event monitors of FIGS. 1 and/or 2.

FIG. 4 is a block diagram illustrating an example implementation of an example haptic event monitor 400. The example haptic event monitor 400 of FIG. 4 may correspond to any one of the haptic event monitors 112, 114, 116 shown in FIG. 1. In the illustrated example, the haptic event monitor 400 includes an example sensor interface 402, an example signature generator 404, an example watermark extractor 406, and an example communications interface 408.

The example sensor interface 402 receives signals from an acoustic sensor (e.g., the sensor 118 of FIG. 1) monitoring acoustic signals produced by the vibrations of the touchscreen 104. The acoustic signals detected by the sensor 118 may be provided to the signature generator 404 and/or the watermark extractor 406 for analysis. In some examples, the signature generator 404 is implemented based on functionality associated with a software development kit provided by the AME 110. In some examples, the signature generator 404 processes an acoustic signal to identify and/or generate audio signatures based on the acoustic signal. The generated audio signatures may be transmitted by the example communications interface 408 to the data collection facility 120 of the AME 110 for comparison to reference signatures to identify the content being presented and/or the texture(s) generated by the touchscreen 104. In some examples, where the haptic event monitor 400 is integrated with the computing device 102, the communications interface 408 of FIG. 4 may correspond to the communications interface 202 of FIG. 2. Content identification may also be accomplished on the monitoring device itself, when generated audio signatures are compared against known available audio signatures without transmitting them to the data collection facility.

Additionally or alternatively, in some examples, signals detected by the sensor 118 may be provided to the watermark extractor 406. The example watermark extractor 406 monitors the sensor output indicative of the acoustic signal to detect and extract watermarks therefrom. In some examples, the watermark extractor 406 is implemented based on functionality associated with a software development kit provided by the AME 110. When a watermark is detected, the watermark is transmitted by the example communications interface 408 to the data collection facility 120 of the AME 110 to determine the content being presented and/or texture(s) generated by the touchscreen as indicated by the identifying information contained in the watermark.

While an example manner of implementing the haptic event monitor 400 of FIG. 4 is illustrated in FIG. 4, one or more of the elements, processes and/or devices illustrated in FIG. 4 may be combined, divided, re-arranged, omitted, eliminated and/or implemented in any other way. Further, the example sensor interface 402, the example signature generator 404, the example watermark extractor 406, the example communications interface 408, and/or, more generally, the example haptic event monitor 400 of FIG. 4 may be implemented by hardware, software, firmware and/or any combination of hardware, software and/or firmware. Thus, for example, any of the example sensor interface 402, the example signature generator 404, the example watermark extractor 406, the example communications interface 408, and/or, more generally, the example haptic event monitor 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 402, the example signature generator 404, the example watermark extractor 406, and/or the example communications interface 408 is/are hereby expressly defined to include a non-transitory computer readable storage device or storage disk such as a memory, a digital versatile disk (DVD), a compact disk (CD), a Blu-ray disk, etc. including the software and/or firmware. Further still, the example haptic event monitor 400 of FIG. 4 may include one or more elements, processes and/or devices in addition to, or instead of, those illustrated in FIG. 4, and/or may include more than one of any or all of the illustrated elements, processes and devices.

Figure 5:
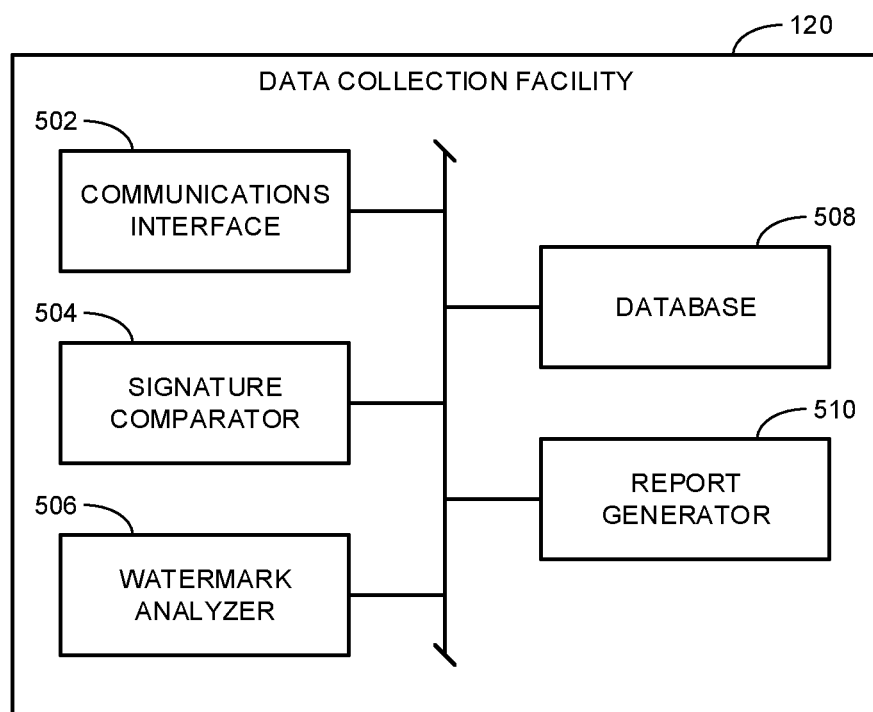
FIG. 5 is a block diagram illustrating an example implementation of the example data collection facility of FIG. 1.

FIG. 5 is a block diagram illustrating an example implementation of the example data collection facility 120 of FIG. 1. The data collection facility 120 of the illustrated example includes an example communications interface 502, an example signature comparator 504, an example watermark analyzer 506, an example database 508, and an example report generator 510.

In the illustrated example, the communications interface 502, which may be implemented by a modem or other communication device, serves to communicate with one or more of the computing device 102, the haptic event monitors 112, 114, 116, 400, and/or the content provider 108. In some examples, the data collection facility 120 provides watermarks via the communications interface 502 to the computing device 102 and/or the content provider 108 for embedding in the surface haptic control signals associated with media content displayed via the touchscreen 104 of the computing device 102. In some examples, the communications interface 502 of the data collection facility 120 receives haptic metering data transmitted from the haptic event monitors 112, 114, 116, 400. As used herein, haptic metering data includes audio signatures generated from acoustic signals produced by vibrations of the touchscreen 104 and/or audio watermarks extracted from such acoustic signals. In some examples, the received haptic metering data is stored on the example database 508. In some examples, the data collection facility 120 provides the haptic event monitor 112 via the communications interface 502 for implementation on the computing device 102. In some examples, the communications interface 502 provides the haptic event monitor 112 to third party application developers to be embedded or incorporated into developed applications that may subsequently be downloaded and/or installed by a user on the computing device 102.

The example signature comparator 504 of FIG. 5 compares signatures reported from a haptic event monitor 112, 114, 116, 400 with reference signatures stored in the database 508. The database 508 also stores identifying information associated with the reference signatures to identify the content and/or operations being performed on the device that give rise to the vibrations from which the reference signature was extracted and/or the texture(s) represented by the vibrations. As such, when the signature comparator 504 identifies a match between a collected signature and a reference signature, the signature comparator associates the identifying information of the reference signature with the collected signature.

The example watermark analyzer 506 of FIG. 5 analyzes watermarks reported from a haptic event monitor 112, 114, 116, 400 to determine the content and/or associated texture(s) corresponding to the acoustic signals from which the watermarks were extracted. In some examples, the content and/or texture(s) may be identified directly from the identifying information included in the watermarks. In other examples, the identifying information includes an identifier that the watermark analyzer 506 may use to lookup the corresponding content and/or texture(s) in the database 508.

In the illustrated example, the data collection facility 120 includes the example report generator 510 to generate reports based on the collected metering data (e.g., audio signatures and/or audio watermarks). In some examples, the reports may aggregate metering data collected from multiple haptic touchscreen computing devices 102 associated with multiple users. The reports may indicate the type of media content (and associated textures) accessed by users, audience measurement metrics (e.g., determine ratings) for the media content, textures being generated, operations being performed on the devices 102 to cause the haptic vibration to be generated, and/or any other relevant information.

While an example manner of implementing the data collection facility 120 of FIG. 1 is illustrated in FIG. 5, one or more of the elements, processes and/or devices illustrated in FIG. 5 may be combined, divided, re-arranged, omitted, eliminated and/or implemented in any other way. Further, the example communications interface 502, the example signature comparator 504, the example watermark analyzer 506, the example database 508, the example report generator 510, and/or, more generally, the example data collection facility 120 of FIG. 1 may be implemented by hardware, software, firmware and/or any combination of hardware, software and/or firmware. Thus, for example, any of the example communications interface 502, the example signature comparator 504, the example watermark analyzer 506, the example database 508, the example report generator 510, and/or, more generally, the example data collection facility 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 502, the example signature comparator 504, the example watermark analyzer 506, the example database 508, and/or the example report generator 510 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data collection facility 120 of FIG. 1 may include one or more elements, processes and/or devices in addition to, or instead of, those illustrated in FIG. 5, and/or may include more than one of any or all of the illustrated elements, processes and devices.

Figure 6:
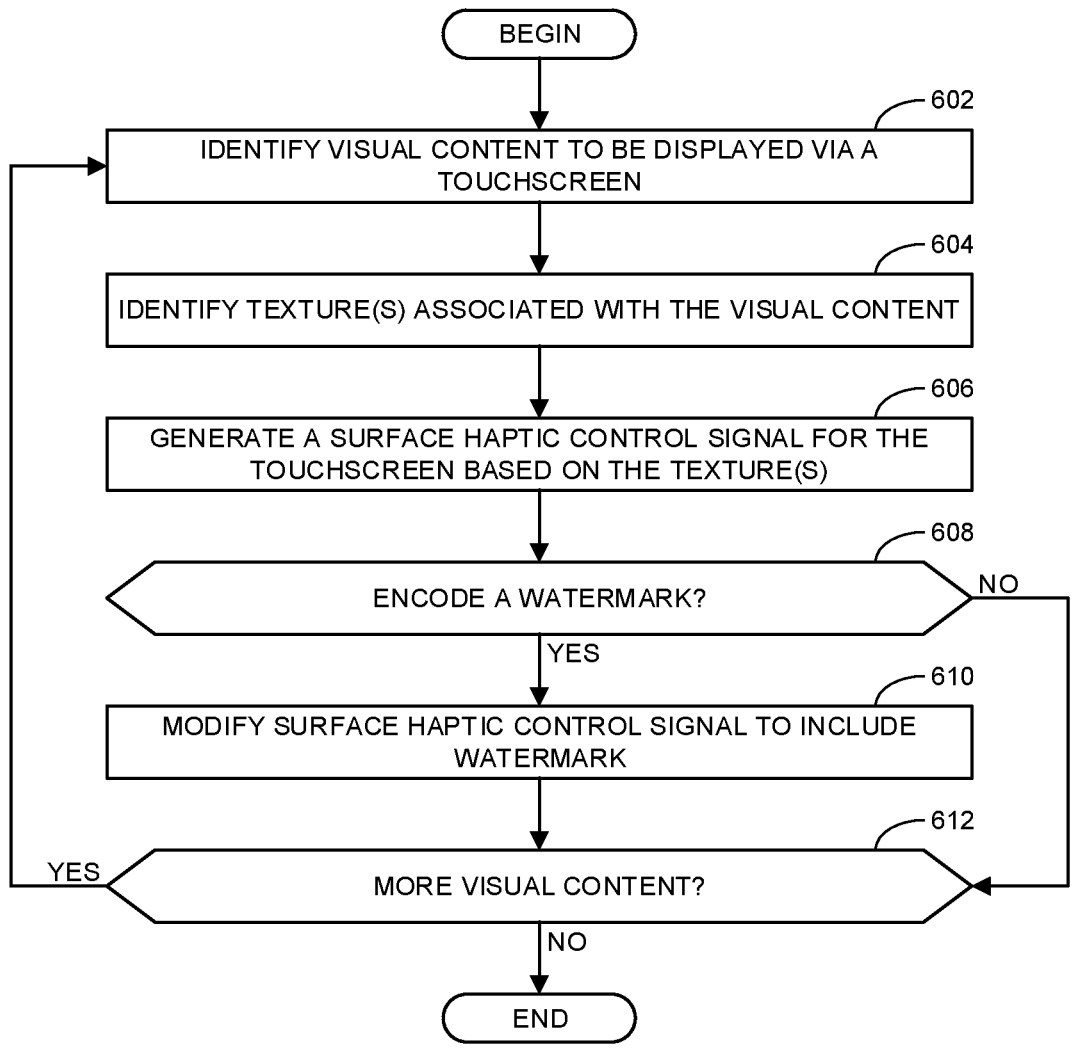
FIG. 6 is a flowchart representative of example machine readable instructions that may be executed to implement the example haptic signal definer of FIGS. 1-3.

A flowchart representative of example hardware logic, machine readable instructions, hardware implemented state machines, and/or any combination thereof for implementing the haptic signal definer 106 of FIGS. 1-3 is shown in FIG. 6. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 6, many other methods of implementing the example haptic signal definer 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The program of FIG. 6 begins at block 602, where the example content identifier 302 identifies visual content to be displayed via a touchscreen (e.g., the touchscreen 104 of FIG. 1). At block 604, the example content identifier 302 identifies texture(s) associated with the visual content. In some examples, the content and/or the texture(s) may be identified by metadata associated with the media content. In other examples, the content identifier 302 may analyze the media to determine the content and/or associated texture(s). At block 606, the example haptic signal generator 304 generates a surface haptic control signal for the touchscreen 104 based on the texture(s).

At block 608, the example watermark encoder 306 determines whether to encode a watermark. If so, control advances to block 610 where the example watermark encoder 306 modifies the surface haptic control signal to include the watermark before advancing to block 612. If the example watermark encoder 306 determines not to encode a watermark (block 608), control advances directly to block 612. At block 612, the example content identifier 302 determines whether there is more visual content. If so, control returns to block 602. Otherwise, the example program of FIG. 6 ends.

What occurs with the surface haptic control signal after completion of the example program of FIG. 6 may depend on the configuration of the haptic signal definer 106. For example, if the haptic signal definer 106 is implemented by a content provider 108, the content provider may associate the surface haptic control signal with the corresponding content and store it for subsequent distribution to end users requesting the content using a surface haptic computing device (e.g., the computing device 102 of FIG. 1). In other examples, the content provider 108 may cause the haptic signal definer 106 to generate a surface haptic control signal in response to receiving a request from a user of the computing device 102. In some examples, the initial surface haptic control signal (generated at block 606) may be generated in advance, whereas the encoding of the watermark (at block 608) may occur in substantially real-time when the content is accessed by a user using the computing device 102.

In other examples, the computing device 102 may implement the haptic signal definer 106 to generate the surface haptic control signal locally at the computing device 102. In some examples, the content provider 108 may provide the initial surface haptic control signal to the computing device 102 and the haptic signal definer 106 of the computing device 102 subsequently modifies the signal to encode the watermark therein. In any case, once the control signal is available at the computing device 102, the haptic signal definer 106 may provide the signal to the surface haptic controller 204 of the computing device 102 to control the vibrations of the touchscreen 104.

Figure 7:
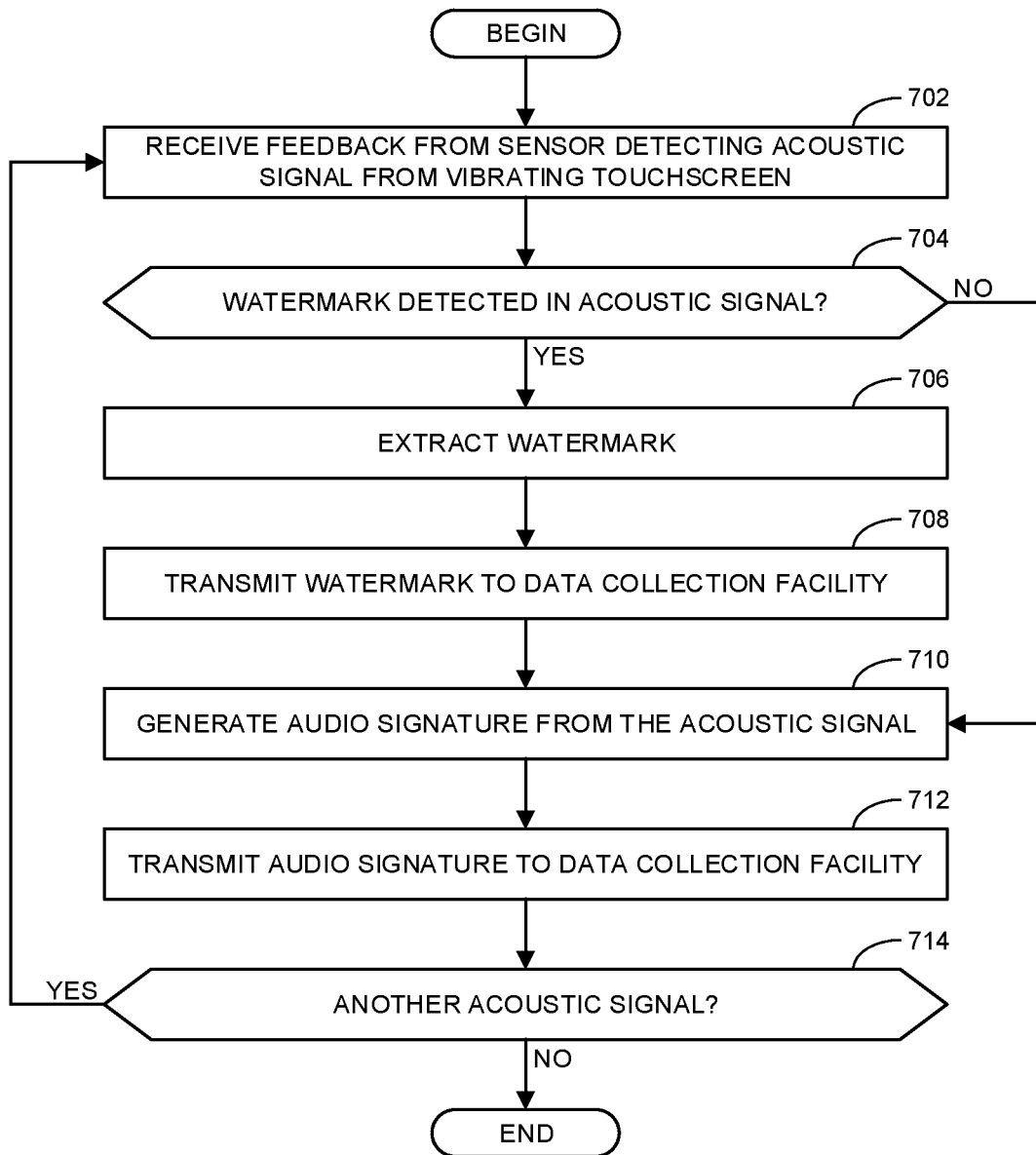
FIG. 7 is a flowchart representative of example machine readable instructions that may be executed to implement the example haptic event monitor of FIGS. 1, 2, and/or 4.

A flowchart representative of example hardware logic, machine readable instructions, hardware implemented state machines, and/or any combination thereof for implementing the haptic event monitor 400 of FIG. 4 is shown in FIG. 7. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 7, many other methods of implementing the example haptic event monitor 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The example program of FIG. 7 begins at block 702 where the example sensor interface 402 receives feedback from a sensor (e.g., the sensor 118) detecting an acoustic signal from a vibrating touchscreen (e.g., the touchscreen 104). At block 704, the example watermark extractor 406 determines whether a watermark is detected in the acoustic signal. If so, control advances to block 706 where the example watermark extractor 406 extracts the watermark. At block 708, the example communications interface 408 transmits the watermark to the data collection facility 120. Thereafter, control advances to block 710. If the example watermark extractor 406 does not detect a watermark in the acoustic signal (block 704), control advances directly to block 710.

At block 710, the example signature generator 404 generates an audio signature from the acoustic signal. At block 712, the communications interface 408 transmits the audio signature to the data collection facility 120. In some examples, blocks 710 and 712 are implemented as an alternative to blocks 706 and 708. That is, in some examples, the haptic event monitor 400 may detect and report either watermarks or signatures but not both. In other examples, the haptic event monitor 400 may collect and report both watermarks and signatures to the data collection facility 120 as shown in the illustrated example. At block 714, it is determined whether there is another acoustic signal. If so, control returns to block 702. Otherwise, the example process of FIG. 7 ends.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 8:
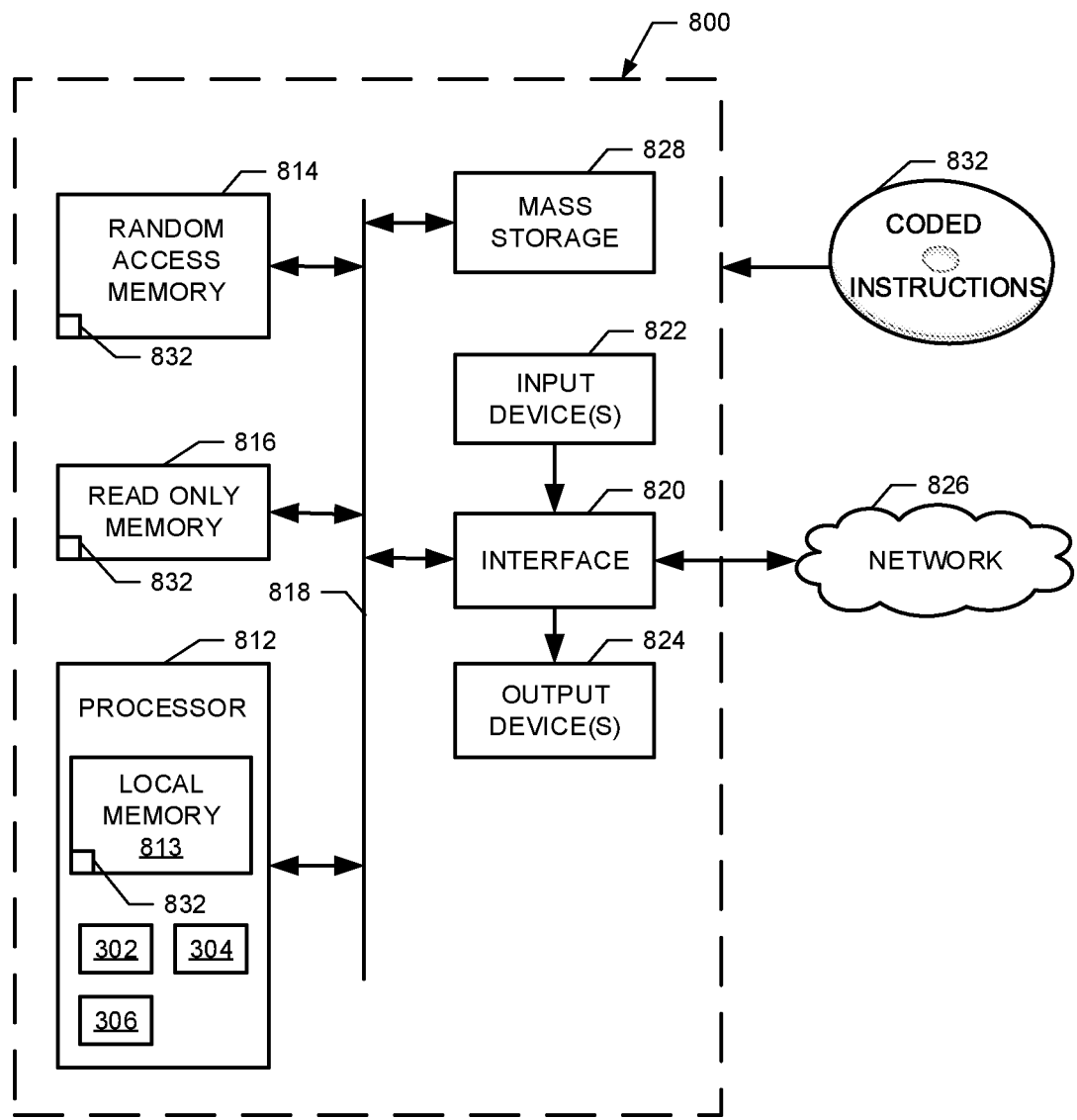
FIG. 8 is a block diagram of an example processing platform structured to execute the instructions of FIG. 6 to implement the example haptic signal definer of FIGS. 1-3.

FIG. 8 is a block diagram of an example processor platform 800 structured to execute the instructions of FIG. 6 to implement the haptic signal definer 106 of FIGS. 1-3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements content identifier 802, the haptic signal generator 804, and the watermark encoder 806.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD.

Figure 9:
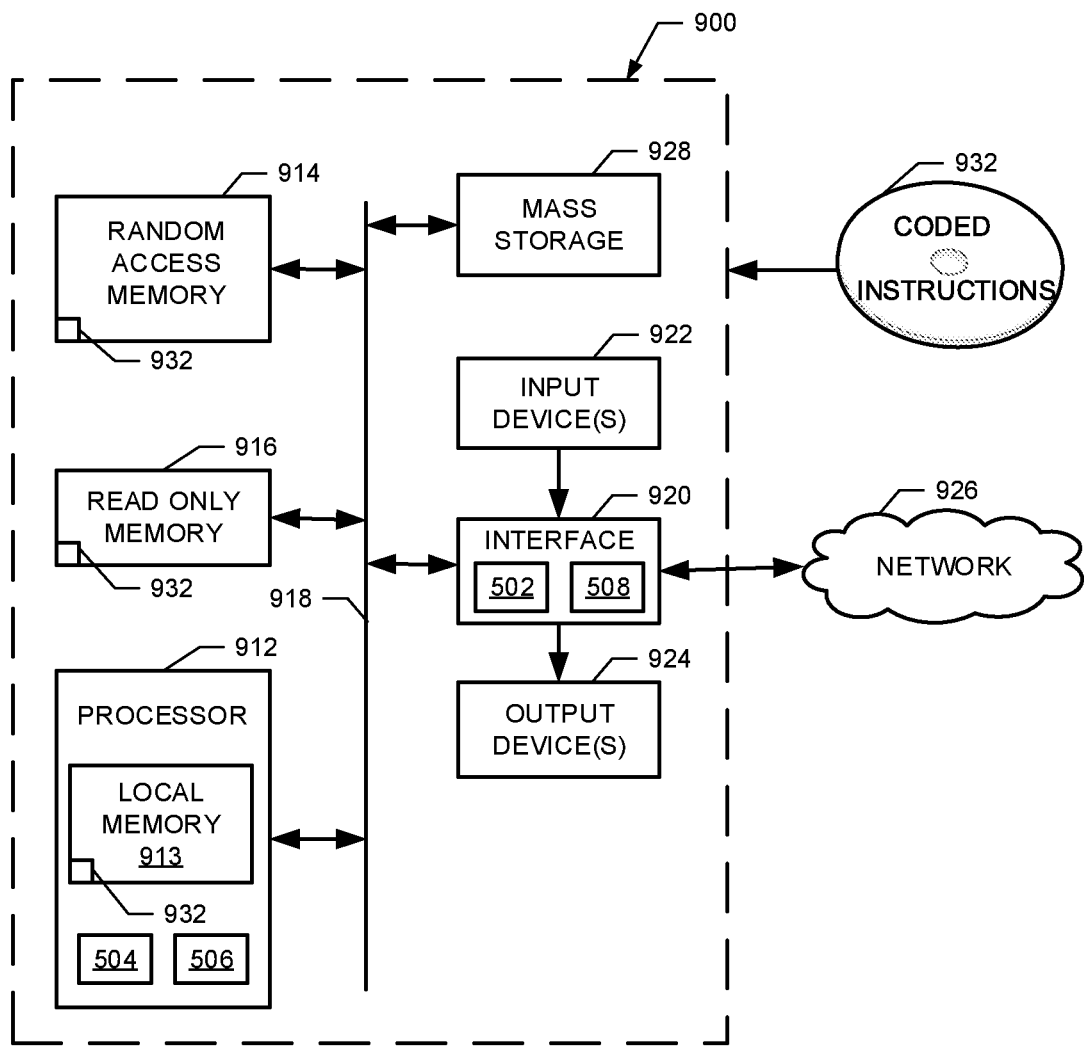
FIG. 9 is a block diagram of an example processing platform structured to execute the instructions of FIG. 7 to implement the example haptic event monitor of FIGS. 1, 2, and/or 4.

FIG. 9 is a block diagram of an example processor platform 900 structured to execute the instructions of FIG. 7 to implement the haptic event monitor 400 of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the signature comparator 504 and the watermark extractor 906.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface. In this example, the interface circuit includes the sensor interface 902 and the communications interface 908.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that enabling the monitoring and tracking of new forms of media based on surface haptic technology that produces the sensation or perception of texture on touchscreens. Such technology is based on vibrating touchscreens using precisely controlled ultrasonic vibrations. Examples disclosed herein use sensors to detect acoustic signals produced by such vibrations to automatically detect the texture being generated and/or the associated content being displayed on the touchscreen. In some examples, the surface haptic control signals used to control the vibrations of the touchscreen are modified so that watermarks may be embedded therein and detected from the acoustic signal resulting therefrom.

Example 1 includes an apparatus comprising a haptic signal generator to obtain a surface haptic control signal that is to cause a touchscreen to vibrate to generate a perception of a texture for a user interacting with the touchscreen, the texture corresponding to content displayed on the touchscreen, and a watermark encoder to encode a watermark into the surface haptic control signal to generate a watermarked surface haptic control signal, the watermark including identifying information to identify at least one of the content or the texture.

Example 2 includes the apparatus as defined in example 1, further including a communications interface to transmit the watermarked surface haptic control signal to a computing device, the computing device including the touchscreen.

Example 3 includes the apparatus as defined in example 1, further including the touchscreen.

Example 4 includes the apparatus as defined in example 3, further including a surface haptic controller to vibrate the touchscreen based on the watermarked surface haptic control signal.

Example 5 includes the apparatus as defined in example 1, wherein the watermark encoder encodes the watermark into the surface haptic control signal by modifying the surface haptic control signal to cause vibrations based on at least one of different frequencies or different amplitudes for defined durations.

Example 6 includes the apparatus as defined in example 1, wherein the watermark encoder encodes the watermark into the surface haptic control signal using modulated signal with an amplitude that is a function of time.

Example 7 includes the apparatus as defined in example 1, wherein differences in vibrations caused by the surface haptic control signal and the watermarked surface haptic control signal are not discernable by human touch.

Example 8 includes the apparatus as defined in example 1, wherein the watermark is detectable using a sensor monitoring an acoustic signal generated by the vibration of the touchscreen.

Example 9 includes a method comprising generating, by executing an instruction with a processor, a surface haptic control signal that is to cause a touchscreen to vibrate to generate a sensation of a texture for a user interacting with the touchscreen, the texture corresponding to content displayed on the touchscreen, and encoding, by executing an instruction with a processor, a watermark into the surface haptic control signal to generate a watermarked surface haptic control signal, the watermark including identifying information.

Example 10 includes the method as defined in example 9, further including transmitting the watermarked surface haptic control signal to a computing device, the computing device including the touchscreen.

Example 11 includes the method as defined in example 9, wherein the processor and the touchscreen correspond to the same computing device.

Example 12 includes the method as defined in example 11, further including vibrating the touchscreen based on the watermarked surface haptic control signal.

Example 13 includes the method as defined in example 9, further including encoding the watermark into the surface haptic control signal by modifying the surface haptic control signal to cause vibrations based on at least one of different frequencies or different amplitudes for defined durations.

Example 14 includes the method as defined in example 9, wherein differences in vibrations caused by the surface haptic control signal and the watermarked surface haptic control signal are not discernable by human touch.

Example 15 includes the method as defined in example 9, wherein the watermark is detectable using a sensor monitoring an acoustic signal generated by the vibration of the touchscreen.

Example 16 includes a non-transitory computer readable medium comprising instructions that, when executed, cause a processor to at least generate a surface haptic control signal that is to cause a touchscreen to vibrate to generate a sensation of a texture for a user interacting with the touchscreen, the texture corresponding to content displayed on the touchscreen, and encode a watermark into the surface haptic control signal to generate a watermarked surface haptic control signal, the watermark including identifying information.

Example 17 includes the non-transitory computer readable medium as defined in example 16, wherein the instructions further cause the processor to transmit the watermarked surface haptic control signal to a computing device, the computing device including the touchscreen.

Example 18 includes the non-transitory computer readable medium as defined in example 16, wherein the processor and the touchscreen are part of a single device.

Example 19 includes the non-transitory computer readable medium as defined in example 18, wherein the instructions further cause the processor to vibrate the touchscreen based on the watermarked surface haptic control signal.

Example 20 includes the non-transitory computer readable medium as defined in example 16, wherein the instructions further cause the processor to encode the watermark into the surface haptic control signal by modifying the surface haptic control signal to cause vibrations at different frequencies for defined durations.

Example 21 includes the non-transitory computer readable medium as defined in example 16, wherein differences in vibrations caused by the surface haptic control signal and the watermarked surface haptic control signal are not discernable by human touch.

Example 22 includes the non-transitory computer readable medium as defined in example 16, wherein the watermark is detectable using a sensor monitoring an acoustic signal generated by the vibration of the touchscreen.

Example 23 includes an apparatus comprising a sensor to detect an acoustic signal produced by a haptic vibration of a touchscreen, a signal processor to extract metering data from the acoustic signal, and a communications interface to transmit the metering data to a data collection facility.

Example 24 includes the apparatus as defined in example 23, wherein the haptic vibration is generated based on a surface haptic control signal, the surface haptic control signal to generate a perception of a texture for a user interacting with the touchscreen.

Example 25 includes the apparatus as defined in example 24, wherein the metering data includes a watermark encoded in the acoustic signal, the watermark including identifying information to identify the texture.

Example 26 includes the apparatus as defined in example 25, further including a haptic signal generator to modify the surface haptic control signal to encode the watermark in the acoustic signal.

Example 27 includes the apparatus as defined in example 23, wherein the metering data includes a signature sampled from the acoustic signal.

Example 28 includes the apparatus as defined in example 23, wherein the sensor is a button microphone affixed to the touchscreen.

Example 29 includes the apparatus as defined in example 23, further including the touchscreen.

Example 30 includes the apparatus as defined in example 23, wherein the touchscreen corresponds to a computing device other than the apparatus.

Example 31 includes the apparatus as defined in example 23, wherein the sensor is an ultrasonic sensor.

Example 32 includes a method comprising detecting, with a sensor, an acoustic signal produced by a haptic vibration of a touchscreen, extracting, by executing an instruction with a processor, metering data from the acoustic signal, and transmitting the metering data to a data collection facility.

Example 33 includes the method as defined in example 32, wherein the haptic vibration is generated based on a surface haptic control signal, the surface haptic control signal to generate a perception of a texture for a user interacting with the touchscreen.

Example 34 includes the method as defined in example 33, wherein the metering data includes a watermark encoded in the acoustic signal, the watermark including identifying information to identify the texture.

Example 35 includes the method as defined in example 34, further including modifying the surface haptic control signal to encode the watermark in the acoustic signal.

Example 36 includes the method as defined in example 32, wherein the metering data includes a signature sampled from the acoustic signal.

Example 37 includes the method as defined in example 32, wherein the sensor is a button microphone affixed to the touchscreen.

Example 38 includes the method as defined in example 32, wherein the sensor is a microphone of a computing device, the computing device including the touchscreen.

Example 39 includes the method as defined in example 32, wherein the sensor is a microphone of a first computing device different than a second computing device, the second computing device including the touchscreen.

Example 40 includes the method as defined in example 32, wherein the sensor is an ultrasonic sensor.

Example 41 includes a non-transitory computer readable medium comprising instructions that, when executed, cause a processor to at least detect, with a sensor, an acoustic signal produced by a haptic vibration of a touchscreen, extract metering data from the acoustic signal, and transmit the metering data to a data collection facility.

Example 42 includes the non-transitory computer readable medium as defined in example 41, wherein the haptic vibration is generated based on a surface haptic control signal, the surface haptic control signal to generate a perception of a texture for a user interacting with the touchscreen.

Example 43 includes the non-transitory computer readable medium as defined in example 42, wherein the metering data includes a watermark encoded in the acoustic signal, the watermark including identifying information to identify the texture.

Example 44 includes the non-transitory computer readable medium as defined in example 43, wherein the instructions further cause the process to modify the surface haptic control signal to encode the watermark in the acoustic signal.

Example 45 includes the non-transitory computer readable medium as defined in example 41, wherein the metering data is a signature sampled from the acoustic signal.

Example 46 includes the non-transitory computer readable medium as defined in example 41, wherein the sensor is a button microphone affixed to the touchscreen.

Example 47 includes the non-transitory computer readable medium as defined in example 41, wherein the sensor is a microphone of a computing device, the computing device including the touchscreen.

Example 48 includes the non-transitory computer readable medium as defined in example 41, wherein the sensor is a microphone of a first computing device different than a second computing device, the second computing device including the touchscreen.

Example 49 includes the non-transitory computer readable medium as defined in example 41, wherein the sensor is an ultrasonic sensor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    means for generating a haptic control signal that is to cause vibrations of haptic display means, the vibrations to simulate a texture corresponding to visual subject matter to be displayed on the haptic display means, the vibrations of the haptic display means to produce an acoustically detectable signal; and
    means for encoding a watermark into the haptic control signal to generate a watermarked haptic control signal, the watermark including identification information to identify at least one of the visual subject matter or the texture, the watermark to modify the acoustically detectable signal.

2. The apparatus as defined in claim 1, further including means for transmitting the watermarked haptic control signal to a computing device, the computing device including the haptic display means.

3. The apparatus as defined in claim 1, further including the haptic display means.

4. The apparatus as defined in claim 3, further including means for controlling surface haptics, the means for controlling to cause the haptic display means to vibrate based on the watermarked haptic control signal.

5. The apparatus as defined in claim 1, wherein the means for encoding is to encode the watermark into the haptic control signal by modifying the haptic control signal to cause the vibrations based on at least one of different frequencies or different amplitudes.

6. The apparatus as defined in claim 1, wherein the means for encoding is to encode the watermark into the haptic control signal using a modulated signal with an amplitude that is a function of time.

7. The apparatus as defined in claim 1, wherein differences in vibrations caused by the haptic control signal and the watermarked haptic control signal are not discernable by human touch.

8. The apparatus as defined in claim 1, wherein the vibrations are ultrasonic vibrations.

9. An apparatus comprising:
    means for sensing an acoustic signal produced by a haptic vibration of a haptic display means, the haptic vibration generated based on a haptic control signal modified to encode a watermark in the acoustic signal, the haptic control signal to cause vibrations of the haptic display means that simulate a texture for a user of the haptic display means;
    means for extracting metering data from the acoustic signal, the watermark corresponding to the metering data, the metering data including identification information to identify at least one of the texture or visual subject matter to be displayed on the haptic display means, the texture corresponding to the visual subject matter; and
    means for transmitting the metering data to a data collection facility.

10. The apparatus as defined in claim 9, further including means for generating haptic signals, the means for generating haptic signals to modify the haptic control signal to encode the watermark in the acoustic signal.

11. The apparatus as defined in claim 9, wherein the means for sensing is a button microphone affixed to the haptic display means.

12. The apparatus as defined in claim 9, further including the haptic display means.

13. The apparatus as defined in claim 9, wherein the haptic display means corresponds to a computing device other than the apparatus.

14. The apparatus as defined in claim 9, wherein the means for sensing is an ultrasonic sensor.

15. A method comprising:
    detecting, with a sensor, an acoustic signal produced by a haptic vibration of a touchscreen, the haptic vibration generated based on a haptic control signal modified to encode a watermark in the acoustic signal, the haptic control signal to cause vibrations of the touchscreen that simulate a texture for a user of the touchscreen;

extracting metering data from the acoustic signal, the watermark corresponding to the metering data, the metering data including identification information to identify at least one of the texture or visual subject matter to be displayed on the touchscreen, the texture corresponding to the visual subject matter; and transmitting the metering data to a data collection facility.

16. The method as defined in claim 15, further including modifying the haptic control signal to encode the watermark in the acoustic signal.

17. The method as defined in claim 15, wherein the sensor is a button microphone affixed to the touchscreen.

18. The method as defined in claim 15, wherein the sensor is an ultrasonic sensor.

19. The method as defined in claim 15, further including displaying visual subject matter on the touchscreen, the texture corresponding to the visual subject matter.

20. The method as defined in claim 15, wherein the touchscreen corresponds to a computing device other than an apparatus containing the sensor.

* * * * *